US012262171B2

(12) United States Patent
Yoshimura et al.

(10) Patent No.: US 12,262,171 B2
(45) Date of Patent: Mar. 25, 2025

(54) AUDIO SPOT FORMING DEVICE

(71) Applicant: NIPPON TELEGRAPH AND TELEPHONE CORPORATION, Tokyo (JP)

(72) Inventors: Yusuke Yoshimura, Tokyo (JP); Yuta Ikeguchi, Tokyo (JP); Hisatoshi Kasahara, Tokyo (JP); Atsushi Aratake, Tokyo (JP); Shuichi Yanagi, Tokyo (JP); Suguru Oguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 161 days.

(21) Appl. No.: 17/913,423

(22) PCT Filed: Mar. 27, 2020

(86) PCT No.: PCT/JP2020/014196
§ 371 (c)(1),
(2) Date: Sep. 21, 2022

(87) PCT Pub. No.: WO2021/192261
PCT Pub. Date: Sep. 30, 2021

(65) Prior Publication Data

US 2023/0097117 A1 Mar. 30, 2023

(51) Int. Cl.

| | |
|---|---|
| ***H04R 1/32*** | (2006.01) |
| ***H04R 1/02*** | (2006.01) |
| ***H04R 5/02*** | (2006.01) |

(52) U.S. Cl.
CPC ............. *H04R 1/323* (2013.01); *H04R 1/026* (2013.01); *H04R 5/02* (2013.01); *H04R 2201/025* (2013.01); *H04R 2217/03* (2013.01)

(58) Field of Classification Search
CPC .......... H04R 1/323; H04R 1/026; H04R 5/02; H04R 2201/025; H04R 2217/03
See application file for complete search history.

(56) References Cited

U.S. PATENT DOCUMENTS

| | | | | |
|---|---|---|---|---|
| 2009/0028376 A1* | 1/2009 | Saito | H04R 7/12 181/173 |
| 2013/0077803 A1 | 3/2013 | Fumiyasu et al. | |

FOREIGN PATENT DOCUMENTS

| | | |
|---|---|---|
| JP | 201370213 A | 4/2013 |
| JP | 2015065540 A | 4/2015 |
| JP | 202010408 A | 1/2020 |

OTHER PUBLICATIONS

Matsui et al. (2014) "Audio Spot Design Based on Separating Emission of Carrier and Sideband Waves" Journal of the Society of Electronic Information and Communication A, vol. J97-A, No. 4, pp. 304-312.

* cited by examiner

*Primary Examiner* — Andrew Sniezek

(57) ABSTRACT

In an audio spot formation device D including a speaker unit 1 and a support stand 2 that supports the speaker unit 1, the speaker unit 1 includes a plurality of parametric speakers 1*a*, 1*b*, 1*c* and 1*d* that divide a sound wave into a carrier wave and a sideband wave and radiate the carrier wave and the sideband wave, and a speaker disposition unit 10 in which the plurality of speakers 1*a*, 1*b*, 1*c* and 1*d* are disposed, the speaker disposition unit 10 is attached to the support stand 2 at a support unit P, at least one of a height of the support stand 2, an angle of attachment of the speaker disposition unit 10 at the support unit P and a direction of at least one parametric speaker of the plurality of parametric speakers 1*a*, 1*b*, 1*c* and 1*d* is adjustable, and a position at which an audio spot is formed is adjusted via the adjustment.

16 Claims, 15 Drawing Sheets r = ∞ r = 20cm r = 10cm

AUDIO SPOT FORMING DEVICE

CROSS-REFERENCE TO RELATED APPLICATIONS

This application is a U.S. National Stage Application filed under 35 U.S.C. § 371 claiming priority to International Patent Application No. PCT/JP2020/014196, filed on 27 Mar. 2020, the disclosure of which is hereby incorporated herein by reference in its entirety.

TECHNICAL FIELD

The present disclosure relates to an audio spot formation device.

BACKGROUND ART

Conventionally, a technique that reproduces sound only in a particular area called an audio spot by dividing a sound wave into a carrier wave and a sideband wave and radiating the carrier wave and the sideband wave from respective speakers has been known (for example, Non-Patent Literature 1). As techniques related to such technique, a technique that forms an audio spot by emitting a sideband wave and a carrier wave from two flat speakers, such as illustrated in FIG. 9A, and a technique that expands an audio spot by emitting a sideband wave from a flat speaker and emitting a carrier wave from a curved speaker, such as illustrated in FIG. 9B, have been known (for example, Patent Literature 1). As another related technique, a technique that controls an audio spot by controlling a radiation direction of each curved speaker using a motorized pan head, such as illustrated in FIGS. 10A and 10B, has been known. These techniques are effective where the number of parametric speakers is small.

CITATION LIST

Non-Patent Literature

Non-Patent Literature 1: Tadashi Matsui, Daisuke Ikefuji, Masato Nakayama, Takanobu Nishiura, "Audio Spot Design Based on Separating Emission of Carrier and Sideband Waves", IEICE TRANSACTIONS on Fundamentals of Electronics, Communications and Computer Sciences, Japanese Edition, April 2014, A Vol. J97-A, No. 4, pp. 304-312

PATENT LITERATURE

Patent Literature 1: Japanese Patent Laid-Open No. 2015-065540

SUMMARY OF THE INVENTION

Technical Problem

Where the number of speakers is increased, such as a case where audible sound in an audio spot is to be made louder, control that is different from control of the speakers in the above techniques is needed.

An object of the present invention made in view of such point is to provide an audio spot formation device capable of adjusting a position of an audio spot to a position suitable for a use, using parametric speakers.

Means for Solving the Problem

In order to solve the above problem, an audio spot formation device according to the present disclosure is an audio spot formation device including a speaker unit and a support stand that supports the speaker unit, wherein the speaker unit includes a plurality of parametric speakers that divide a sound wave into a carrier wave and a sideband wave and radiate the carrier wave and the sideband wave, and a speaker disposition unit in which the plurality of parametric speakers are disposed, the speaker disposition unit is attached to the support stand at a support unit, at least one of a height of the support stand, an angle of attachment of the speaker disposition unit at the support unit and a direction of at least one parametric speaker of the plurality of parametric speakers is adjustable, and a position at which an audio spot is formed is adjusted via the adjustment.

Effects of the Invention

An audio spot formation device according to the present invention enables adjusting a position of an audio spot to a position suitable for a use.

DESCRIPTION OF EMBODIMENTS

Figure 1:
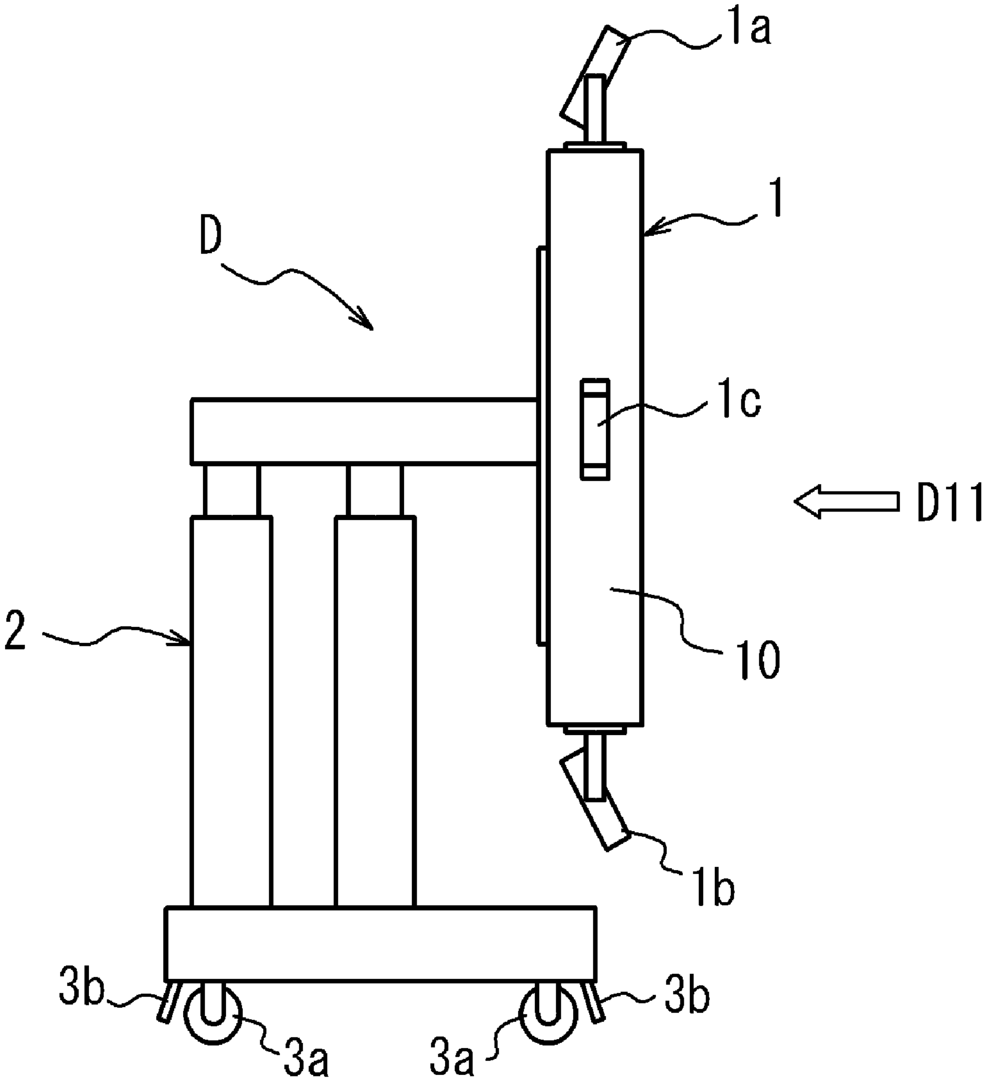
FIG. 1 is a side view of an audio spot formation device according to the present embodiment.

FIG. 1 is a side view of an audio spot formation device D according to the present embodiment. The audio spot formation device D includes at least a speaker unit 1 and a support stand 2. The speaker unit 1 is supported by the support stand 2. The audio spot formation device D may further include a movement mechanism 3*a* and a stop mechanism 3*b*.

The speaker unit 1 includes a plurality of parametric speakers 1*a*, 1*b* and 1*c*, and a speaker disposition unit 10 in which the plurality of speakers 1*a*, 1*b* and 1*c* are disposed. For ease of description, in the below, the parametric speakers are referred to as "speakers". The speaker unit 1 radiates a carrier wave and a sideband wave separately from the plurality of speakers 1*a*, 1*b* and 1*c*. In FIG. 1, the plurality of speakers 1*a*, 1*b* and 1*c* are disposed in one speaker unit 1 but may be disposed in different speaker units 1.

Figure 2:
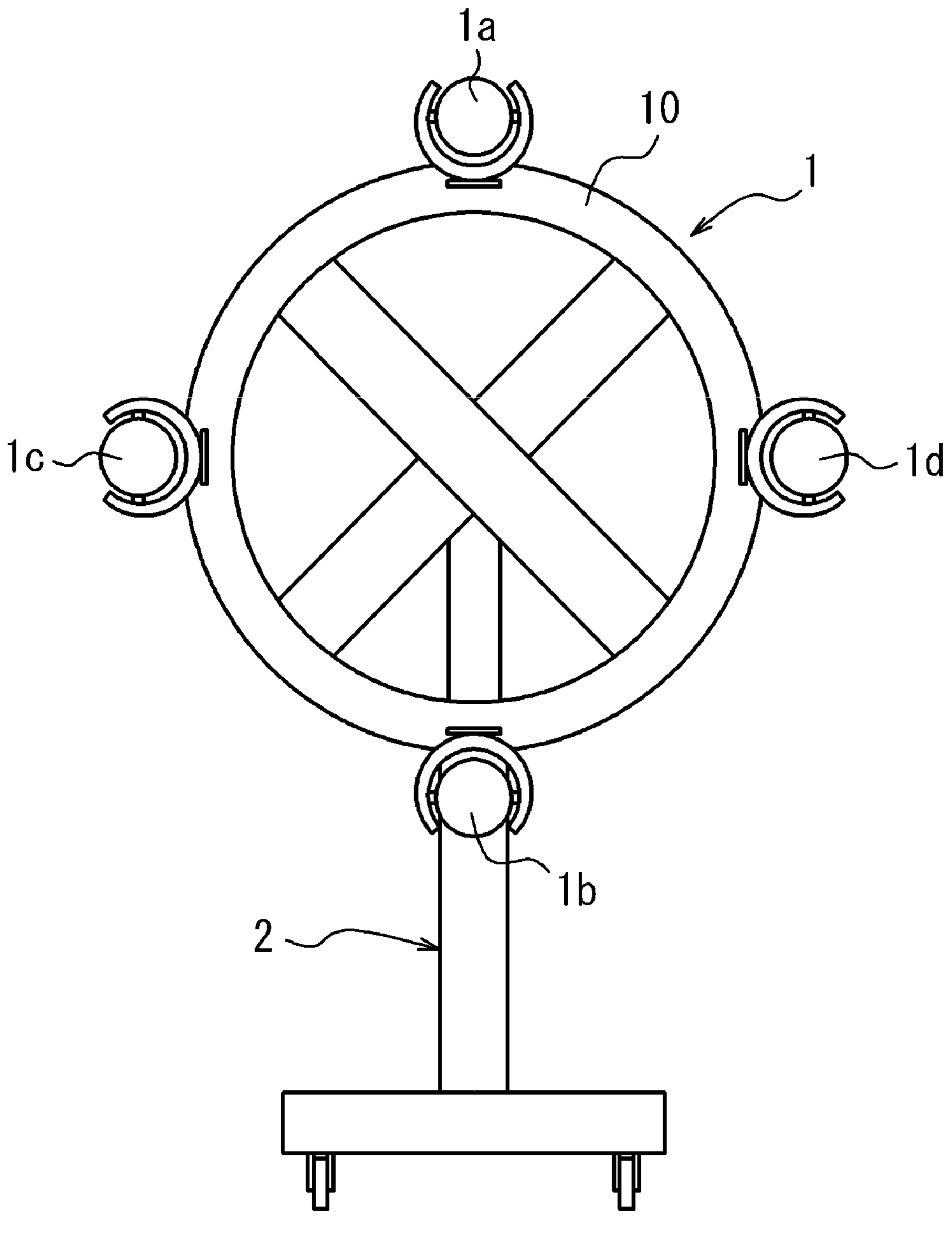
FIG. 2 is a front view of the audio spot formation device.

FIG. 2 is a front view when the audio spot formation device D in FIG. 1 is viewed in a direction D11. As illustrated in FIG. 2, the speaker unit 1 includes a speaker disposition unit 10. In the speaker disposition unit 10, a plurality of speakers 1*a*, 1*b*, 1*c* and 1*d* are disposed. A speaker unit 1 of the present embodiment includes four speakers; however, the number of speakers included is not limited to this example. The audio spot formation device D includes at least a total of two speakers that are one speaker that radiates a carrier wave and one speaker that radiates a sideband wave.

The audio spot formation device D may include a processor (not shown) and a memory (not shown). The processor includes, for example, one or more general-purpose processors each including a CPU (central processing unit) or an MPU (micro processing unit). The processor may include one or more dedicated processors specialized for particular processing. Although the memory is, for example, a semiconductor memory, a magnetic memory or an optical memory, the memory is not limited to these examples. The memory may function as, for example, main storage, auxiliary storage or a cache memory. The memory may store various information pieces relating to operation or control of the audio spot formation device D. The memory may store, e.g., a system program, an application program and embedded software.

The processor of the audio spot formation device D can execute respective adjustment processes, which will be described later, for the speaker unit 1, support stand 2, the movement mechanism 3*a* and the stop mechanism 3*b* according to adjustment information received from an external device. Therefore, the audio spot formation device D can be operated via the external device.

Figure 3:
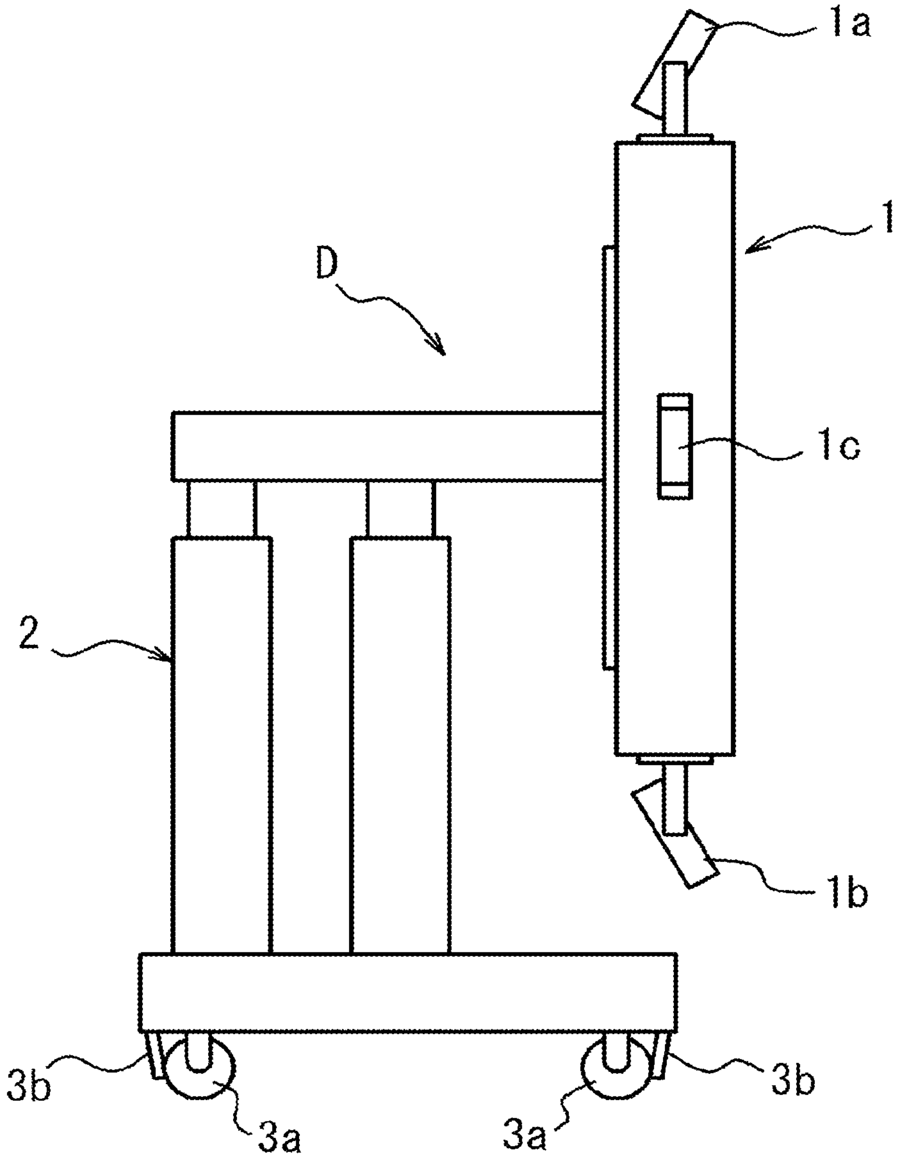
FIG. 3 is a diagram illustrating a situation of use of a stop mechanism.

Referring back to FIG. 1, the audio spot formation device D of the present embodiment includes a movement mechanism 3*a* and a stop mechanism 3*b*. The movement mechanism 3*a* is attached to a ground contact surface of the audio spot formation device D. The movement mechanism 3*a* includes wheels such as casters. The stop mechanism 3*b* includes stoppers for stopping driving of the movement mechanism 3*a*. As illustrated in FIG. 3, a position of the audio spot formation device D can be fixed by fixing the movement mechanism 3*a* via the stop mechanism 3*b*.

Figure 4A:
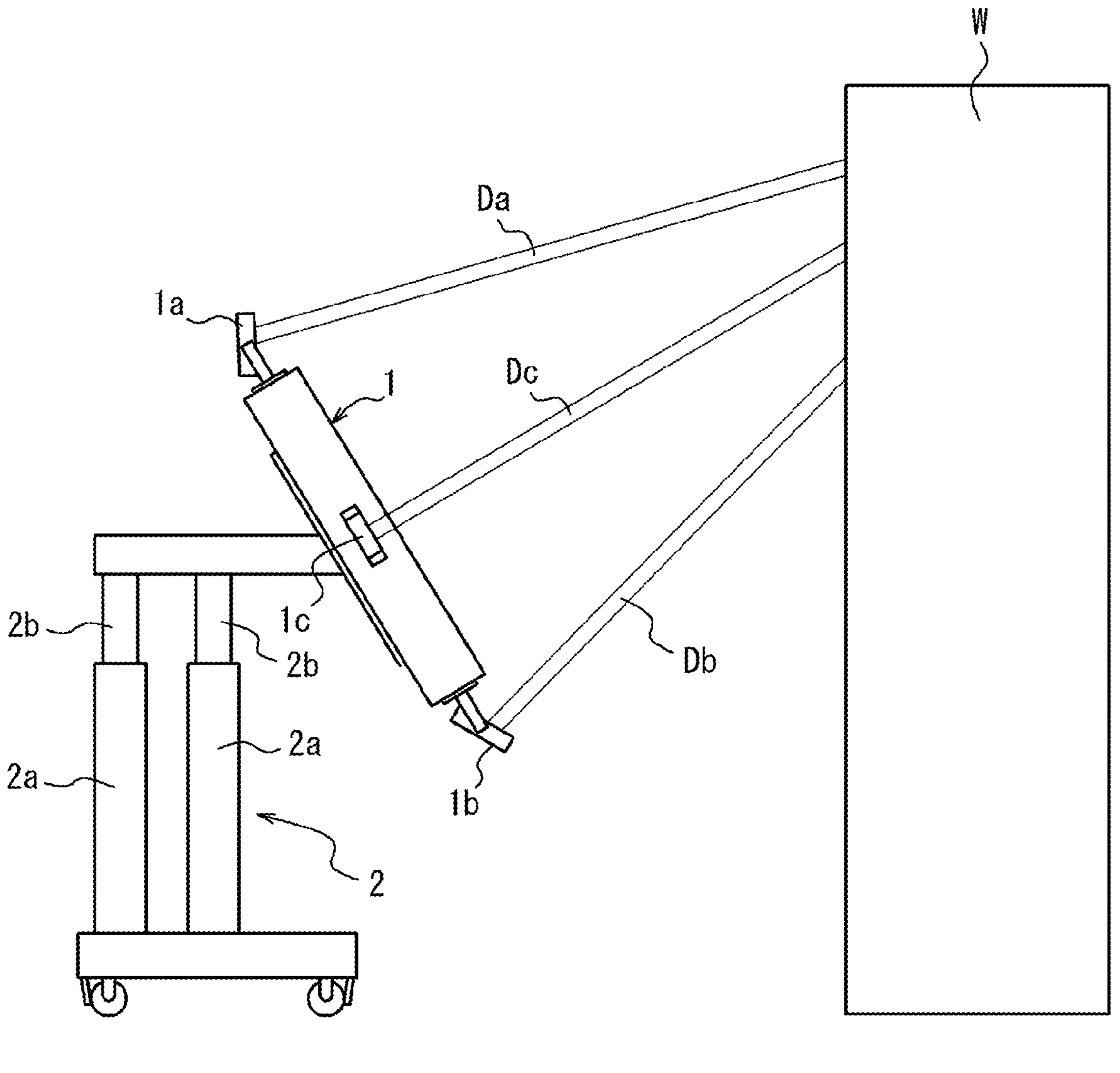
FIG. 4A is a diagram illustrating the audio spot formation device using height adjustment mechanisms.
Figure 4B:
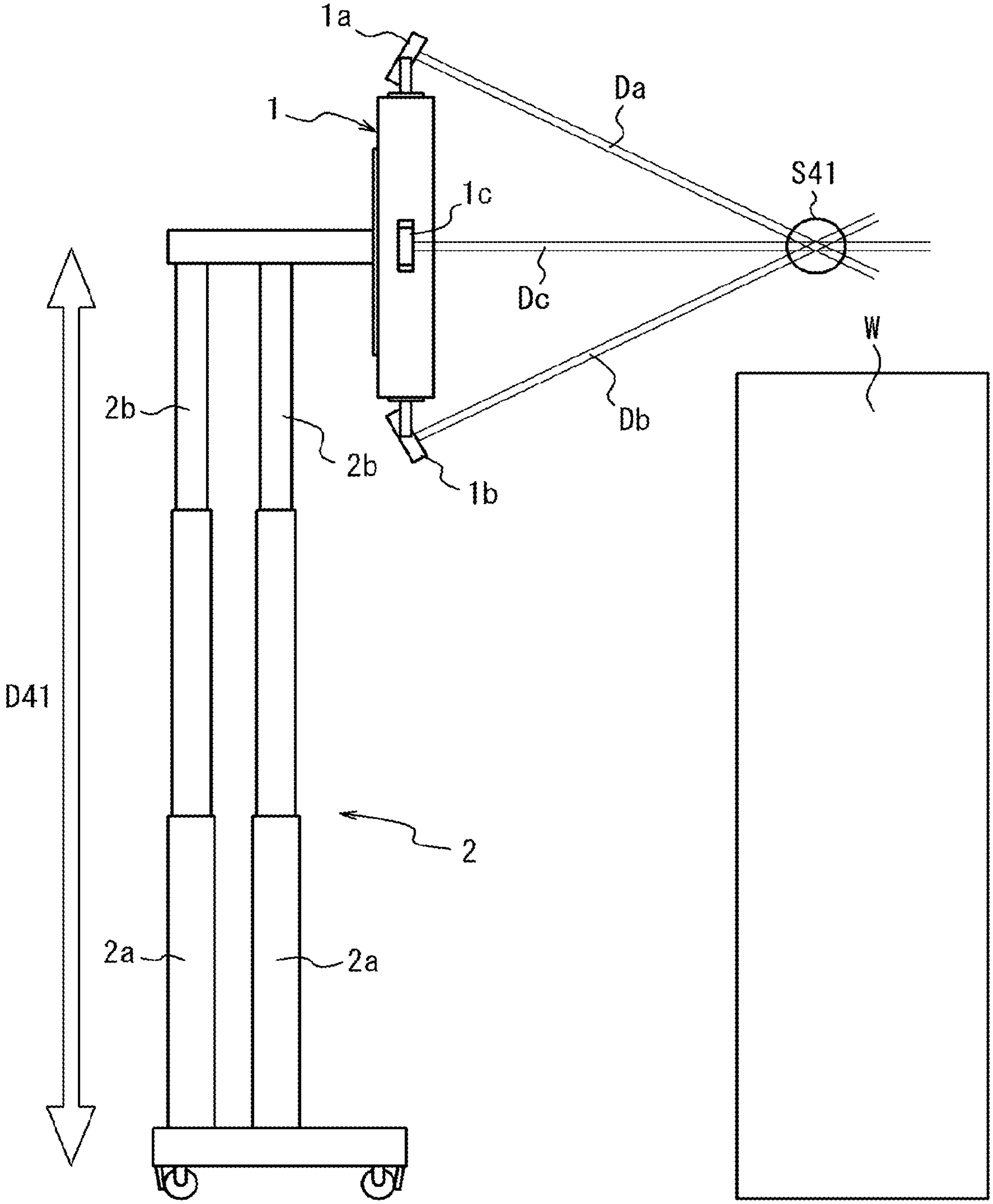
FIG. 4B is a diagram illustrating the audio spot formation device during use of the height adjustment mechanisms.

FIGS. 4A and 4B illustrate control of a height of the audio spot formation device D. As illustrated in FIG. 4A, the speaker 1*a* radiates an ultrasonic wave Da, the speaker 1*b* radiates an ultrasonic wave Db and the speaker 1*c* radiates an ultrasonic wave Dc. Which of the speakers radiates a carrier wave and which of the speakers radiates a sideband wave can arbitrarily be determined. Because of characteristics of the plurality of speakers 1*a*, 1*b* and 1*c*, sound is reproduced in an area in which the ultrasonic wave Da, the ultrasonic wave Db and the ultrasonic wave Dc intersect.

Where an audio spot is formed on the upper side (for example, in an upper tier) using the audio spot formation device D, as illustrated in FIG. 4A, it is necessary to direct the speaker unit 1 upward. However, since there is an obstacle W such as a building or a wall, it is difficult to form an audio spot.

Therefore, as illustrated in FIG. 4B, the support stand 2 in the audio spot formation device D according to the present embodiment includes a height adjustment mechanism 2*a* and a height adjustment mechanism 2*b*. The height adjustment mechanism 2*a* and the height adjustment mechanism 2*b* are formed of respective columnar members having different diameters. The height adjustment mechanism 2*a* is hollow. The height adjustment mechanism 2*b* is inserted in the height adjustment mechanism 2*a* in a height direction D41 of the audio spot formation device D. A position of the height adjustment mechanism 2*b* relative to the height adjustment mechanism 2*a* can be adjusted via fixing the height adjustment mechanism 2*b* using, e.g., screws. A height of the support stand 2 is adjustable, that is, variable. The audio spot formation device D can form an audio spot S41 above the obstacle W by adjusting the height of the support stand 2 to be higher.

Figure 5:
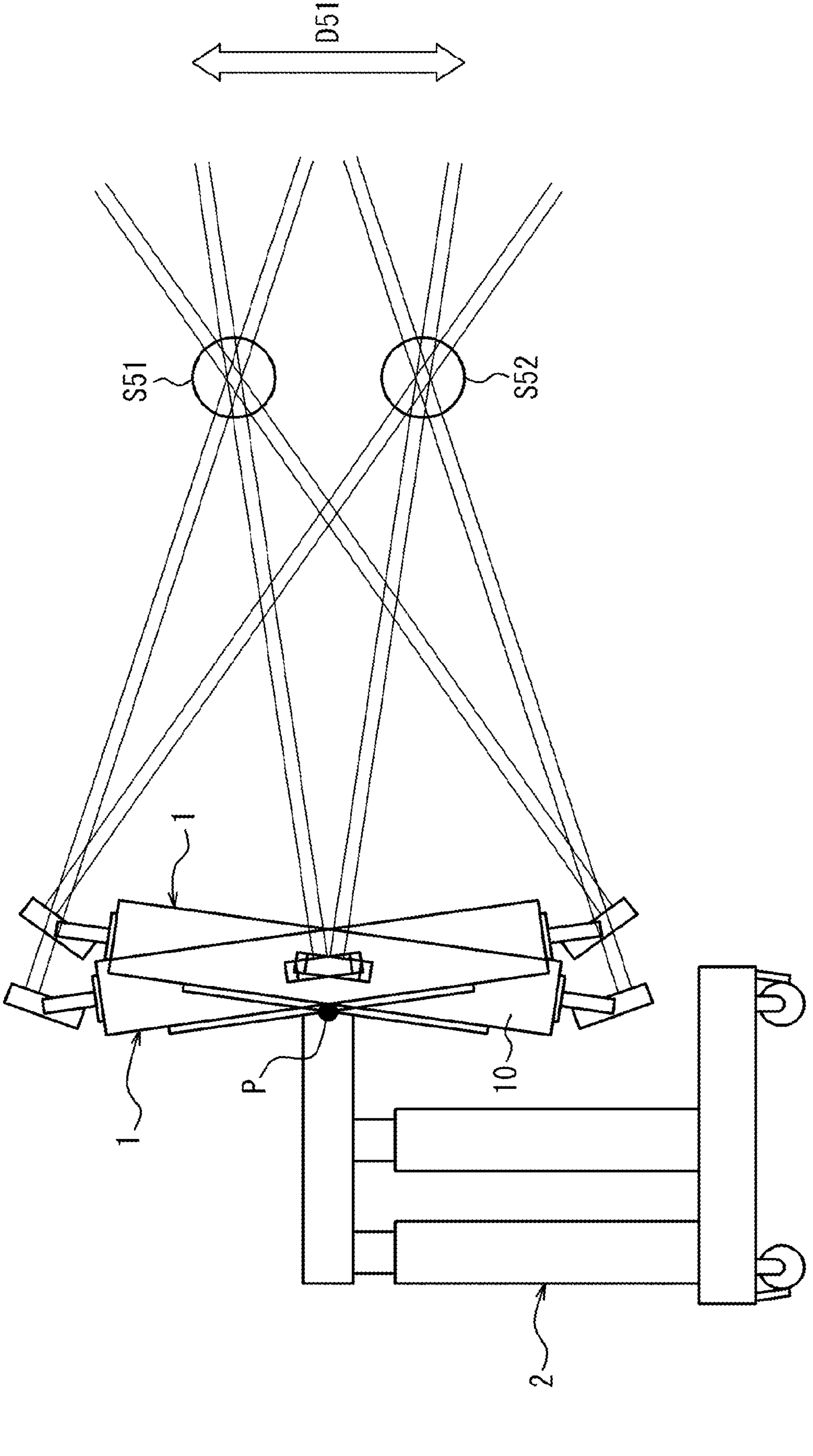
FIG. 5 is a diagram illustrating adjustment of a support unit.

As illustrated in FIG. 5, the support stand 2 includes a support unit P. The speaker disposition unit 10 is attached to the support stand 2 via the support unit P. For example, the support unit P may have a structure like a ball head of a tripod for a camera. An angle of attachment of the speaker disposition unit 10 at the support unit P is adjustable. As illustrated in FIG. 5, the speaker unit 1 can swing spherically around the support unit P. When the speaker unit 1 is directed relatively upward, the audio spot formation device D forms an audio spot S51. On the other hand, when the speaker disposition unit 10 is directed relatively downward as a result of the angle of attachment of the speaker disposition unit 10 being adjusted upward/downward, the audio spot formation device D forms an audio spot S52. In this way, the audio spot formation device D can adjust a position of an audio spot in an up-down direction D51. Additionally, a position of an audio spot can be adjusted rightward/leftward by varying the angle of attachment of the speaker disposition unit 10 rightward/leftward. A position of an audio spot can be changed spherically.

Figure 6A:
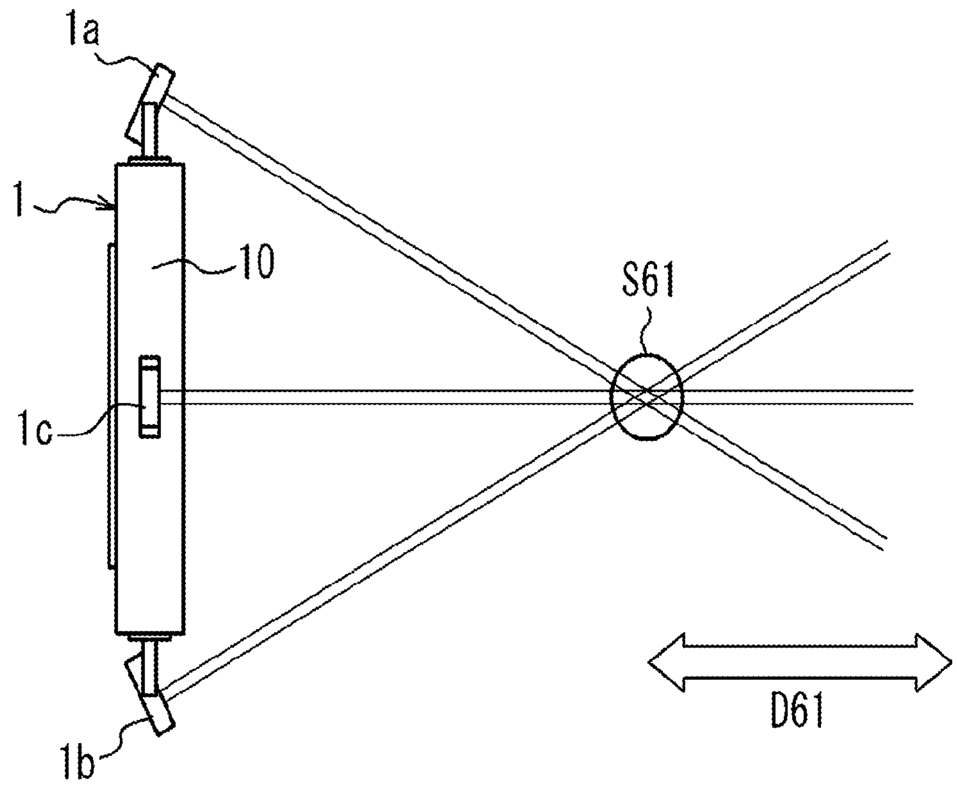
FIG. 6A is a diagram illustrating the audio spot formation device before adjustment of angles of speakers.
Figure 6B:
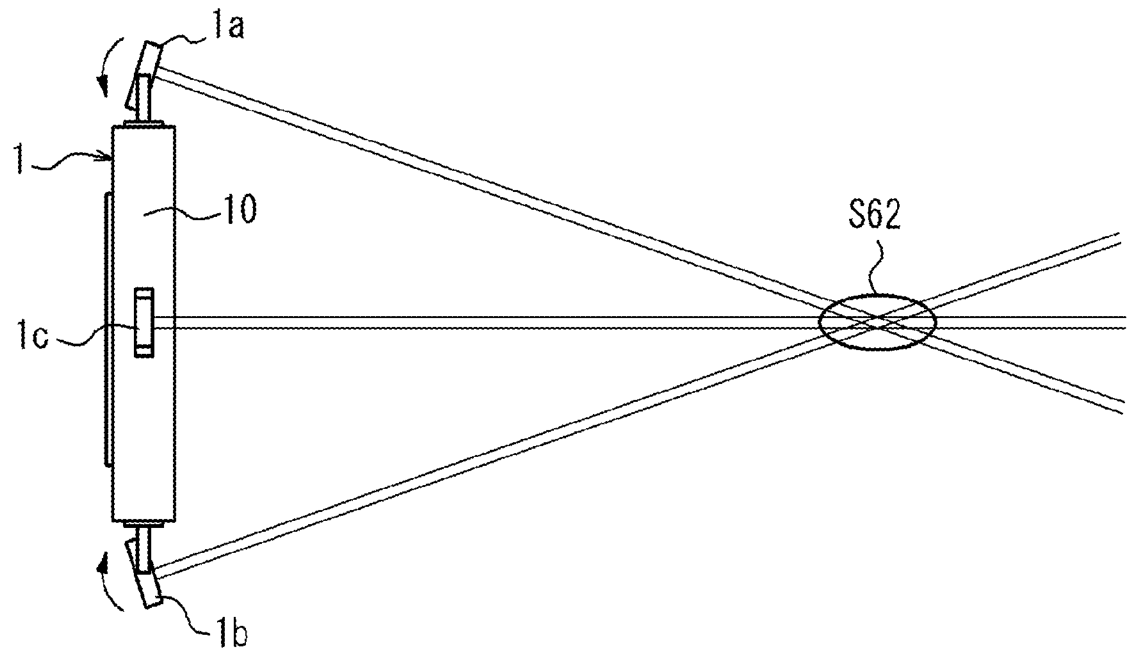
FIG. 6B is a diagram illustrating the audio spot formation device after adjustment of angles of the speakers.

As illustrated in FIGS. 6A and 6B, it is possible to change only respective directions of the plurality of speakers 1*a*, 1*b* and 1*c* without changing the angle of attachment of the speaker disposition unit 10. In this case, two points on opposite sides of each speaker are fixed via screws and each speaker can turn around the two points. When the plurality of speakers 1*a*, 1*b* and 1*c* are directed in such a manner as illustrated in FIG. 6A, the audio spot formation device D forms an audio spot S61. On the other hand, as a result of the speakers being turned to face the respective directions illustrated in FIG. 6B, the audio spot formation device D forms an audio spot S62 with a position of the audio spot changed in a depth direction D61 (right-left direction in FIGS. 6A and 6B).

Figure 7A:
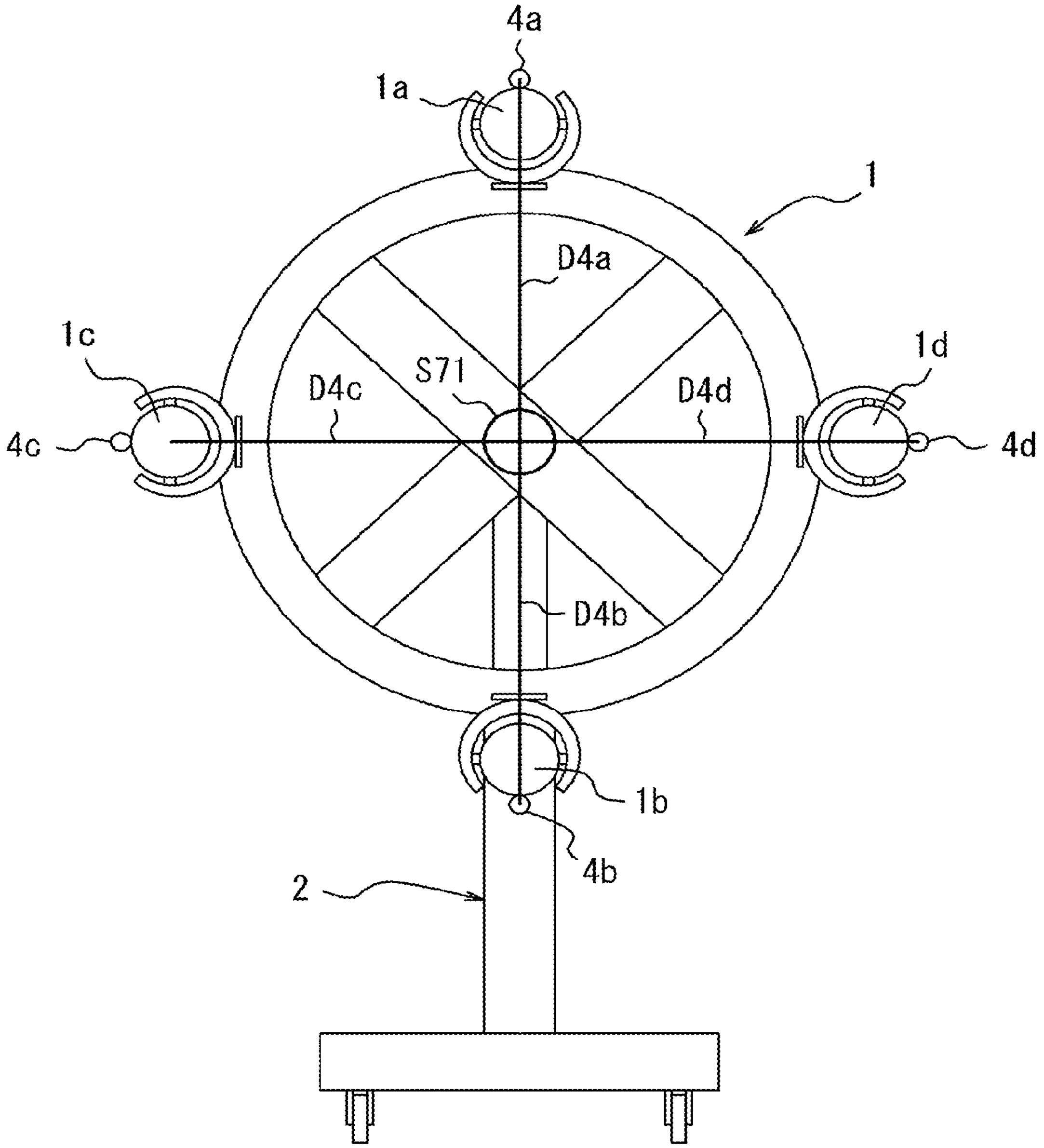
FIG. 7A is a diagram illustrating the audio spot formation device including laser pointers.

As illustrated in FIG. 7A, the audio spot formation device D further includes a laser pointer 4*a*, a laser pointer 4*b*, a laser pointer 4*c* and a laser pointer 4*d* that emit visible light. The laser pointer 4*a*, the laser pointer 4*b*, the laser pointer 4*c* and the laser pointer 4*d* are attached to the plurality of speakers 1*a*, 1*b*, 1*c* and 1*d*, respectively. The laser pointer 4*a*, the laser pointer 4*b*, the laser pointer 4*c* and the laser pointer 4*d* radiate lasers D4*a*, D4*b*, D4*c* and D4*d*, each of which is visible light, in directions that are substantially the same as directions in which the plurality of speakers 1*a*, 1*b*, 1*c* and 1*d* emit ultrasonic waves, respectively.

Figure 7B:
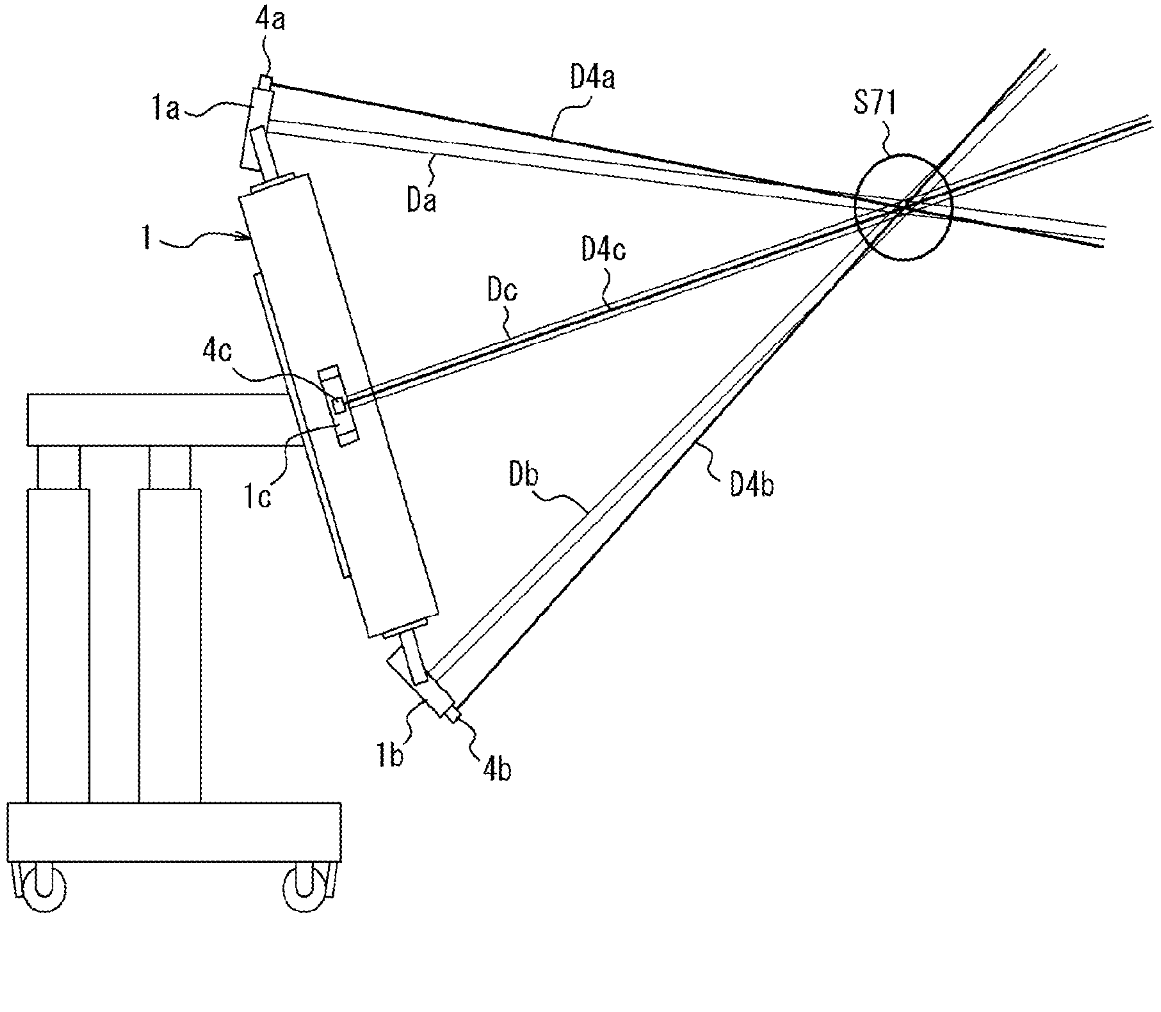
FIG. 7B is a side view of the audio spot formation device in FIG. 7A.

FIG. 7B is a side view of the audio spot formation device D in this case. As illustrated in FIG. 7B, the lasers D4*a*, D4*b*, D4*c* and D4*d* intersect with one another at an audio spot S71.

Figure 8:
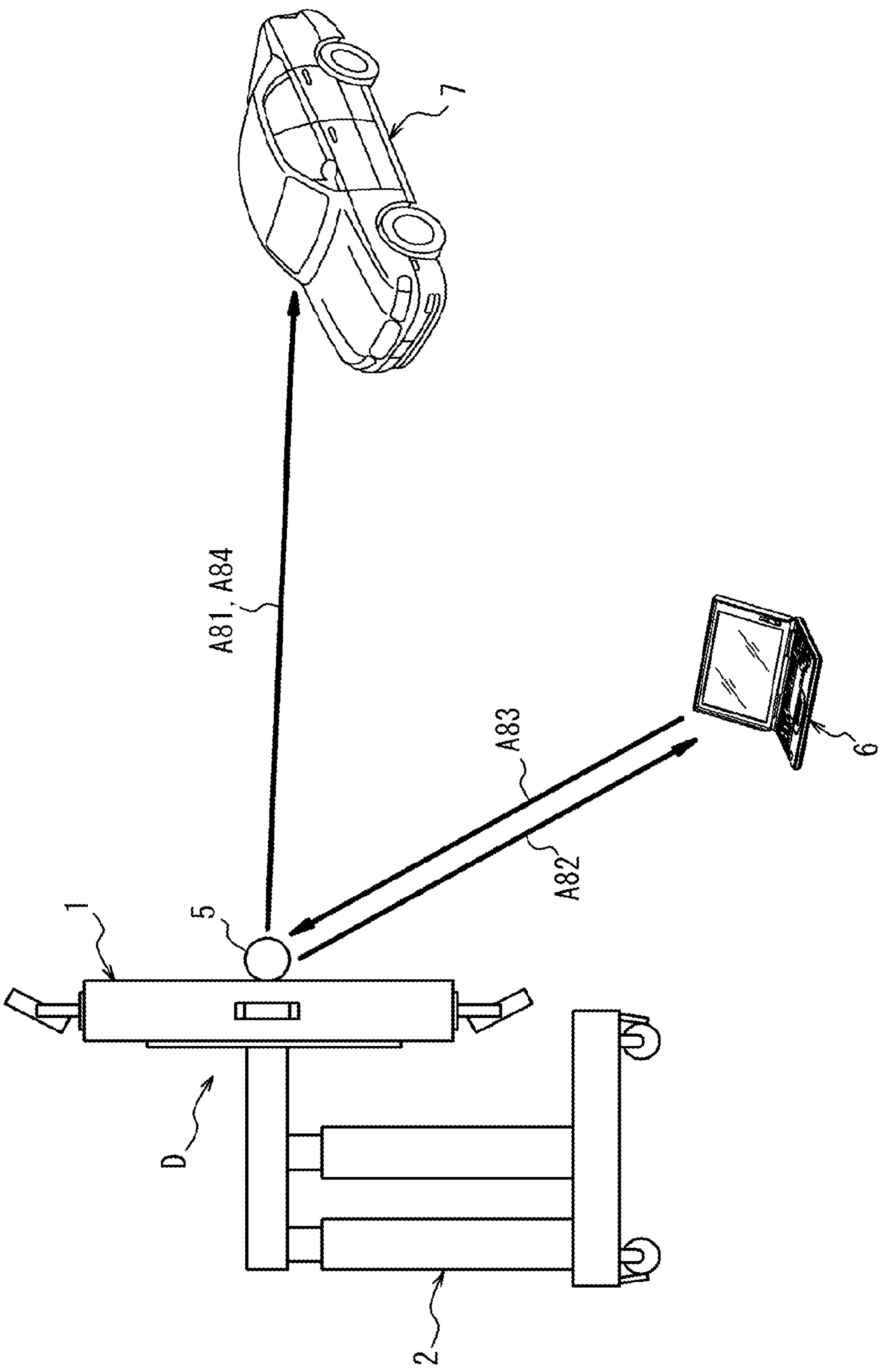
FIG. 8 is a diagram illustrating a situation of use of a velocimeter.
Figure 9A:
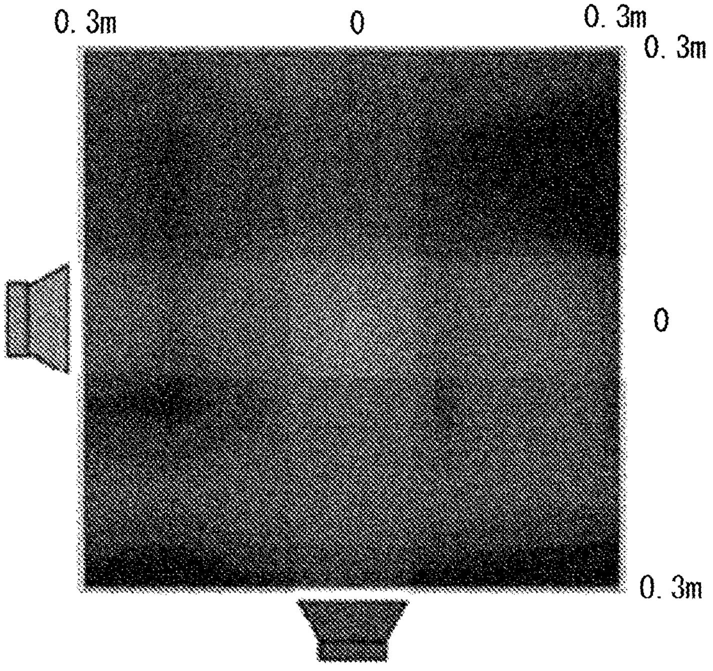
FIG. 9A is a diagram illustrating a flat-type technique that radiates a carrier wave in a conventional technique.
Figure 9B:
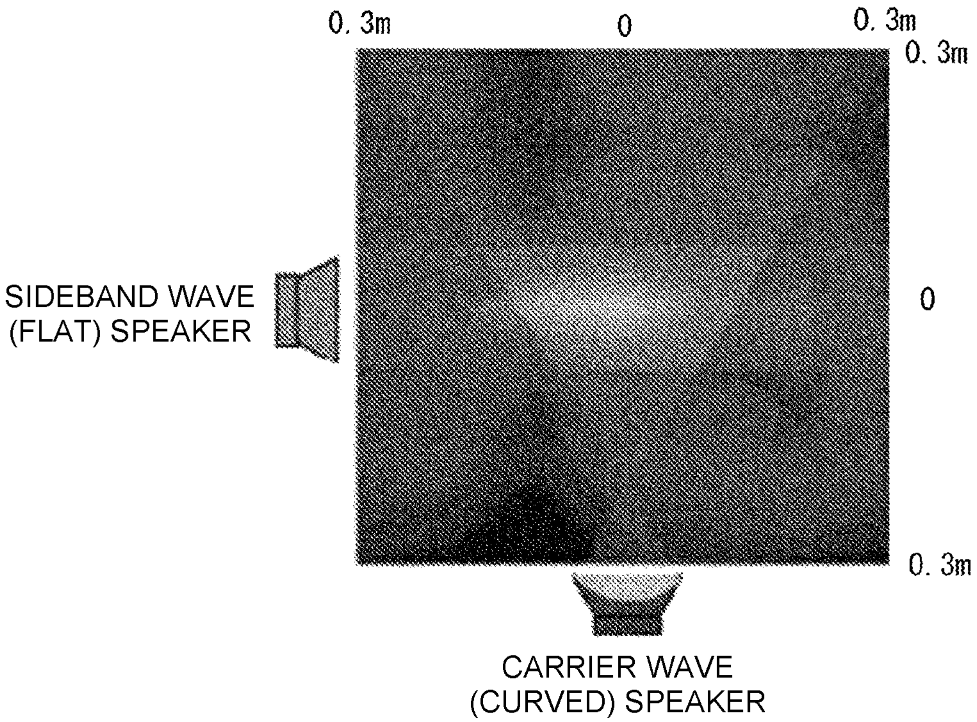
FIG. 9B is a diagram illustrating a curved-type technique that radiates a carrier wave in a conventional technique.
Figure 10A:
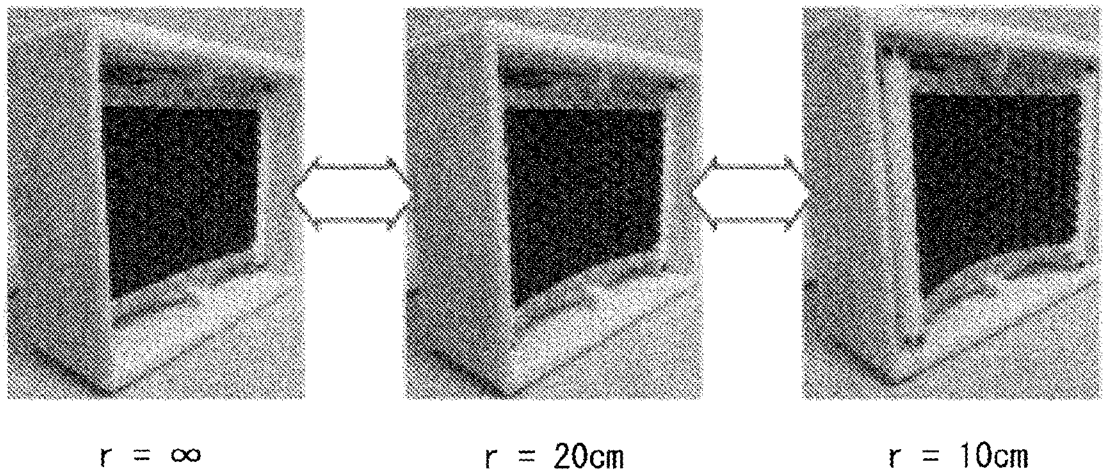
FIG. 10A is a diagram illustrating speakers to be used in a technique that adjusts a radiation direction of a speaker using a motorized pan head in a conventional technique.
Figure 10B:
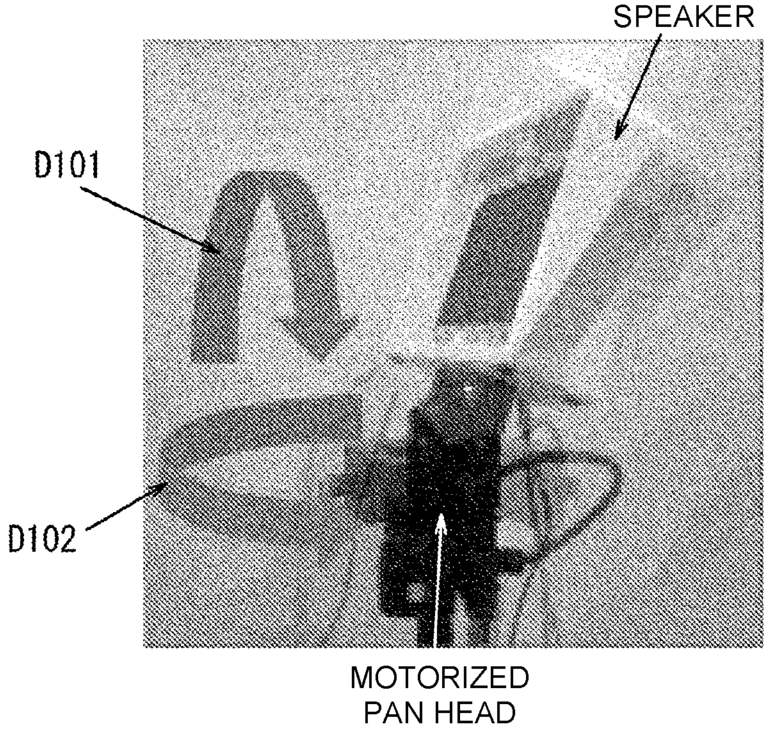
FIG. 10B is a diagram illustrating a technique that adjusts a radiation direction of a speaker using a motorized pan head in a conventional technique.

As illustrated in FIG. 8, the audio spot formation device D further includes a velocimeter 5. The velocimeter 5 may be, for example, a laser Doppler velocimeter. The audio spot formation device D is communicably connected to an information terminal 6 via a wired network or a wireless network.

The information terminal 6 may be a PC (personal computer), a mobile phone, a smartphone or a tablet. The audio spot formation device D successively irradiates a driver of a moving body 7 with an audio spot while following the moving body 7, by repeating the processing in (1) to (6) below in real time. The moving body 7 may be an arbitrary moving body such as a four-wheeled vehicle, a motorcycle, a bicycle, a motorized bicycle, a construction vehicle, a train or an aircraft.

(1) The audio spot formation device D measures a velocity of the moving body 7 using the velocimeter 5 (corresponding to arrow A81).

(2) The audio spot formation device D transmits the measured velocity information to the information terminal 6 (corresponding to arrow A82).

(3) Upon reception of the velocity information, the information terminal 6 generates information of adjustment for the audio spot formation device D based on the velocity information. The adjustment information includes information for adjustment of at least one of the height of the support stand 2 of the audio spot formation device D, the angle of attachment of the speaker disposition unit 10 at the support unit P and the directions of the respective speakers disposed in the speaker disposition unit 10.

(4) The information terminal 6 transmits the generated adjustment information to the audio spot formation device D (corresponding to arrow A83).

(5) Upon reception of the adjustment information, the audio spot formation device D adjusts the audio spot formation device D according to the adjustment information.

(6) The audio spot formation device D irradiates the driver of the moving body 7 with an audio spot (corresponding to arrow A84).

As described above, according to the present embodiment, at least one of the height of the support stand 2, the angle of attachment of the speaker disposition unit 10 at the support unit P and at least one of the directions of the plurality of speakers 1*a*, 1*b*, 1*c* and 1*d* is adjustable. The audio spot formation device D is configured to adjust a position at which an audio spot is formed, via the adjustment. This configuration enables adjusting a position, a shape and a form of an audio spot according to a use.

Also, according to the present embodiment, the audio spot formation device D measures the velocity of the moving body 7 using the velocimeter 5, transmits the measured velocity information to the information terminal 6 and receives adjustment information from the information terminal 6. The audio spot formation device D forms an audio spot in such a manner that the audio spot follows the moving body 7, by adjusting at least one of the height of the support stand 2, the angle of attachment of the speaker disposition unit 10 at the support unit P and at least one of the directions of the plurality of speakers 1*a*, 1*b*, 1*c* and 1*d* using the adjustment information. This configuration enables the audio spot formation device D to successively irradiate the moving body 7 with an audio spot and thus deliver sound to, e.g., the driver of the moving body 7.

Also, according to the present embodiment, the height adjustment mechanism 2*a* is inserted in the height adjustment mechanism 2*b* in the height direction of the audio spot formation device and the position of the height adjustment mechanism 2*a* relative to the height adjustment mechanism 2*b* is adjustable. This configuration facilitates adjustment of the height of the audio spot formation device D.

Also, according to the present embodiment, the audio spot formation device D further includes the movement mechanism 3*a* attached to the ground contact surface of the audio spot formation device D and the stop mechanism 3*b* that stops driving of the movement mechanism 3*a*. This configuration facilitates movement of the audio spot formation device D from a place of storage to a place of use and fixation of the audio spot formation device D at the place of use. Therefore, portability is enhanced.

Also, according to the present embodiment, the audio spot formation device D further includes a plurality of laser pointers (4*a*, 4*b*, 4*c* and 4*d*), and the plurality of laser pointers are attached to the plurality of speakers 1*a*, 1*b*, 1*c* and 1*d*, respectively, and the plurality of speakers 1*a*, 1*b*, 1*c* and 1*d* radiate respective lasers in respective directions that are the same as directions in which the plurality of speakers 1*a*, 1*b*, 1*c* and 1*d* radiate respective ultrasonic waves. The plurality of lasers radiated from the plurality of laser pointers intersect with one another at an audio spot. This configuration enables visualization of directional ultrasonic waves. Also, this configuration enables visual recognition of a position of an audio spot and thus enables fine adjustment of the audio spot.

The audio spot formation device D of the present embodiment can be implemented by an arbitrary computer and a program. More specifically, a program in which contents of processing for implementing the respective functions of the audio spot formation device D are described is recorded on a recording medium such as a memory and the program is read and executed by the processor. Such program can also be provided through a network.

This program may be recorded on a computer-readable medium. Use of a computer-readable medium enables installing on a computer. Here, the computer-readable medium with the program thereon may be a non-transitory recording medium. The non-transitory recording medium is not specifically limited, but may be, for example, a recording medium such as a CD-ROM or a DVD-ROM.

Although the present invention has been described based on the drawings and embodiment, it should be noted that a person skilled in the art can easily make various alternations and modifications based on the present disclosure. Therefore, it should also be noted that these alterations and modifications fall within the scope of the present invention. For example, the functions and the like of the respective component units can be redisposed as long as such redisposition is not logically contradictory, and a plurality of component units can be combined into one or can be divided.

REFERENCE SIGNS LIST

D Audio spot formation device
1 Speaker unit
1*a*, 1*b*, 1*c*, 1*d* Parametric speaker
10 Speaker disposition unit
2 Support stand
2*a*, 2*b* Height adjustment mechanism
3*a* Movement mechanism
3*b* Stop mechanism
4*a*, 4*b*, 4*c*, 4*d* Laser pointer
5 Velocimeter
6 Information terminal
7 Moving body

The invention claimed is:

1. An audio spot formation device comprising:

a processor dividing a sound wave into a carrier wave and a sideband wave and radiate the carrier wave and the sideband wave;

a speaker disposition unit comprising a plurality of parametric speakers, wherein the speaker disposition unit is attached to a support stand at a support unit;

at least one of a height of the support stand, an angle of attachment of the speaker disposition unit at the support unit and a direction of at least one parametric speaker of the plurality of parametric speakers is adjustable; and a position at which an audio spot is formed is adjusted via the adjustment, wherein the audio spot formation device is communicably connected to an information terminal;

measures a velocity of a moving body using a velocimeter;

transmits the measured velocity information to the information terminal;

receives adjustment information from the information terminal; and the audio spot formation device forms the audio spot in such a manner that the audio spot follows the moving body, by adjusting at least one of the height of the support stand, the angle of attachment of the speaker disposition unit at the support unit and the direction of at least one parametric speaker of the plurality of parametric speakers using the adjustment information.

2. The audio spot formation device according to claim 1, wherein the velocimeter is a laser Doppler velocimeter.

3. The audio spot formation device according to claim 2, wherein:

the support stand includes a first height adjustment mechanism and a second height adjustment mechanism;

the first height adjustment mechanism is inserted in the second height adjustment mechanism in a height direction of the audio spot formation device; and a position of the first height adjustment mechanism relative to the second height adjustment mechanism is adjustable.

4. The audio spot formation device according to claim 2, further comprising a movement mechanism attached to a ground contact surface of the audio spot formation device and a stop mechanism that stops driving of the movement mechanism.

5. The audio spot formation device according to claim 3, further comprising a plurality of laser pointers, wherein the plurality of laser pointers are attached to the plurality of parametric speakers, respectively, and radiate respective lasers in respective directions that are the same as directions in which the plurality of parametric speakers radiate respective ultrasonic waves, and the lasers when radiated intersect with each other at the audio spot.

6. The audio spot formation device according to claim 1, wherein:

the support stand includes a first height adjustment mechanism and a second height adjustment mechanism;

the first height adjustment mechanism is inserted in the second height adjustment mechanism in a height direction of the audio spot formation device; and a position of the first height adjustment mechanism relative to the second height adjustment mechanism is adjustable.

7. The audio spot formation device according to claim 6, further comprising a movement mechanism attached to a ground contact surface of the audio spot formation device and a stop mechanism that stops driving of the movement mechanism.

8. The audio spot formation device according to claim 6, further comprising a plurality of laser pointers, wherein the plurality of laser pointers are attached to the plurality of parametric speakers, respectively, and radiate respective lasers in respective directions that are the same as directions in which the plurality of parametric speakers radiate respective ultrasonic waves, and the lasers when radiated intersect with each other at the audio spot.

9. The audio spot formation device according to claim 1, further comprising a movement mechanism attached to a ground contact surface of the audio spot formation device and a stop mechanism that stops driving of the movement mechanism.

10. The audio spot formation device according to claim 1, further comprising a plurality of laser pointers, wherein the plurality of laser pointers are attached to the plurality of parametric speakers, respectively, and radiate respective lasers in respective directions that are the same as directions in which the plurality of parametric speakers radiate respective ultrasonic waves, and the lasers when radiated intersect with each other at the audio spot.

11. The audio spot formation device according to claim 1, wherein:

the support stand includes a first height adjustment mechanism and a second height adjustment mechanism;

the first height adjustment mechanism is inserted in the second height adjustment mechanism in a height direction of the audio spot formation device; and a position of the first height adjustment mechanism relative to the second height adjustment mechanism is adjustable.

12. The audio spot formation device according to claim 1, further comprising a movement mechanism attached to a ground contact surface of the audio spot formation device and a stop mechanism that stops driving of the movement mechanism.

13. The audio spot formation device according to claim 1, further comprising a plurality of laser pointers, wherein the plurality of laser pointers are attached to the plurality of parametric speakers, respectively, and radiate respective lasers in respective directions that are the same as directions in which the plurality of parametric speakers radiate respective ultrasonic waves, and the lasers when radiated intersect with each other at the audio spot.

14. A method for forming an audio spot, comprising:

dividing, by a processor, a sound wave into a carrier wave and a sideband wave and radiate the carrier wave and the sideband wave;

attaching a speaker disposition unit to a support stand at a support unit, wherein the speaker disposition unit comprises a plurality of parametric speakers;

adjusting at least one of a height of the support stand, an angle of attachment of the speaker disposition unit at the support unit, and a direction of at least one parametric speaker of the plurality of parametric speakers; and positioning, based on the adjusting, a position to for an audio spot, wherein the method further comprises:

communicably connecting to an information terminal;

measuring a velocity of a moving body:

transmitting the measured velocity information to the information terminal;

receiving adjustment information from the information terminal; and forming the audio spot in such a manner that the audio spot follows the moving body, by adjusting at least one of the height of the support stand, the angle of attachment of the speaker disposition unit at the support unit and the direction of at least one parametric speaker of the plurality of parametric speakers using the adjustment information.

15. The method according to claim 14, wherein the measuring further comprises measuring based on a laser Doppler.

16. The method according to claim 14, wherein:

the support stand includes a first height adjustment mechanism and a second height adjustment mechanism;

the first height adjustment mechanism is inserted in the second height adjustment mechanism in a height direction; and a position of the first height adjustment mechanism relative to the second height adjustment mechanism is adjustable.

* * * * *